T. R. TIMBY.
Plant-Protectors.
No. 135,173.                                         Patented Jan. 21, 1873.
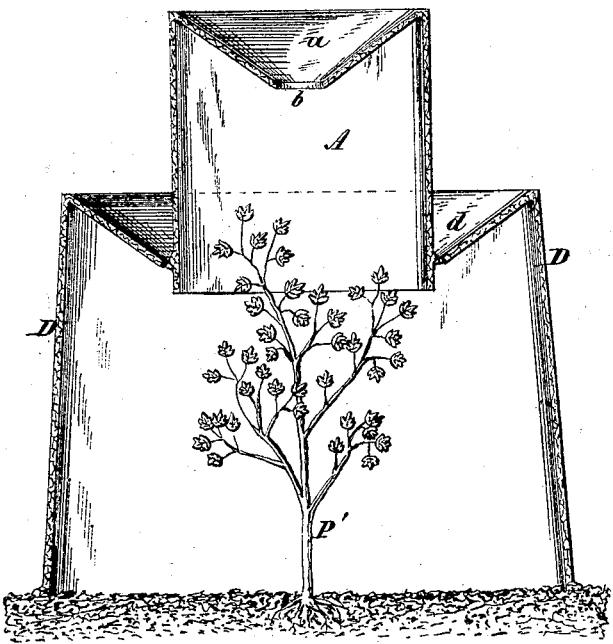
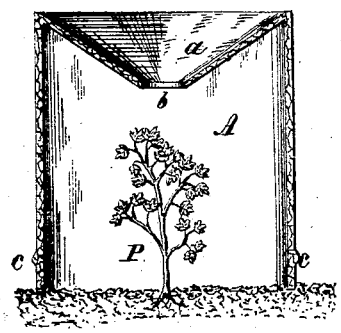
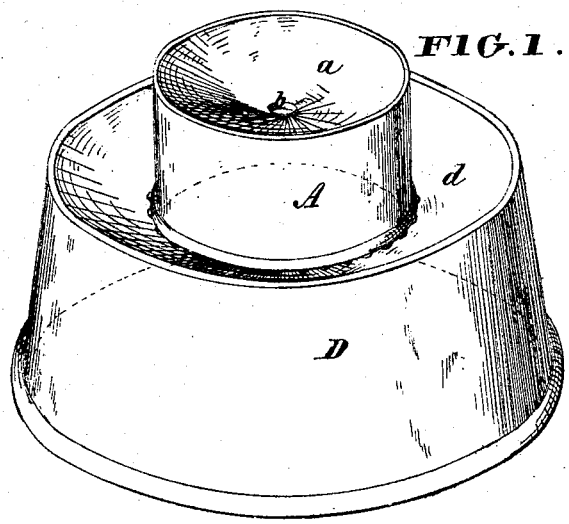
WITNESSES.                                           INVENTOR.

UNITED STATES PATENT OFFICE.

THEODORE R. TIMBY, OF TARRYTOWN, NEW YORK.

IMPROVEMENT IN PLANT-PROTECTORS.

Specification forming part of Letters Patent No. 135,173, dated January 21, 1873.

*To all whom it may concern:*

Be it known that I, THEODORE R. TIMBY, of Tarrytown, in the county of Westchester and State of New York, have invented an Improvement in Plant-Protectors, of which the following is a specification:

Nature and Objects of the Invention.

The subject of my invention is a plant-protector made in two or more parts, adapted to fit one on another, to vary the capacity of the structure, or give the plant more or less exposure to the air.

General Description with Reference to the Drawing.

Figure 1 is a perspective view of a plant-protector illustrating my invention. Fig. 2 is a vertical section showing one part of the apparatus applied to a young plant. Fig. 3 is a vertical section showing the apparatus applied to a plant of larger growth.

A may represent a bell of glass or other material, of cylindrical or other convenient form, having a funnel-shaped top, $a$, terminating in a central aperture, $b$. Near the bottom of the bell A is a bead, $c$, for the purpose hereinafter stated. D is a bell of larger size, having a funnel-shaped top, $d$, terminating in an aperture of larger size, adapted to receive the lower end of the bell A, as shown in Fig. 2. P represents a young plant under the first bell A, and P' an older plant covered by the entire apparatus.

Operation.

When a plant is quite small the bell A is applied as illustrated in Fig. 2. This will effectually protect the plant from cold by retaining a body of still air around it, and by the non-conducting effect of said air confining the heat which would otherwise be radiated from the ground. At the same time the sloping funnel-shaped top $a$ and the central aperture $b$ afford excellent facilities for watering, and give the plant full benefit of the rain. If it be desired to give the plant more air the bell D can be applied instead of A, leaving the large aperture in the top open, and when the plant is to be entirely covered, as at night or on cold days, and has become too large for the bell A, the latter is applied on top of the bell D, as shown in Fig. 3, the bead $c$ resting around the margin of the aperture $b$.

This apparatus will thus be seen to afford facilities for completely protecting young plants from cold, or regulating their exposure to the air with the utmost nicety. It is simple and cheap, readily applied and used, and as conveniently stored away when not wanted. It will be found exceedingly beneficial in permitting the early planting of delicate vegetables in the soil in which they are to permanently grow, thus avoiding much inconvenience, labor, and expense in forcing and subsequent transplanting.

The joint between the funnel $d$ and the bell A is made sufficiently open to allow the passage of rain when both are used together; or corrugations, notches, or apertures may be formed in either at their junction for the same purpose, as illustrated in Figs. 1 and 3.

Claims.

The following is claimed as new:

1. The bell or cover A, constructed with a funnel-shaped top conducting to a central opening of any desired size, and adapted for use as herein described, for the purposes set forth.

2. The combination of the bells A and D, adapted for combined use as herein described.

THEODORE R. TIMBY.

Witnesses:
 OCTAVIUS KNIGHT,
 WALTER ALLEN.